United States Patent [19]
Yamaguchi

[11] 3,927,941
[45] Dec. 23, 1975

[54] PHOTOGRAPHIC ENLARGER MIXING BOX

[75] Inventor: Haruki Yamaguchi, Toyokawa, Japan

[73] Assignee: Minolta Camera Kabushiki Kaisha, Osaka, Japan

[22] Filed: June 28, 1974

[21] Appl. No.: 484,204

[30] Foreign Application Priority Data
July 3, 1973 Japan............................... 48-79411
Jan. 25, 1974 Japan............................... 49-11440
Jan. 28, 1974 Japan............................... 49-12152

[52] U.S. Cl................................. 355/71; 355/71
[51] Int. Cl.² ............................................ G03B 27/76
[58] Field of Search............... 355/18, 21, 32, 35–37, 355/63, 67, 71

[56] References Cited
UNITED STATES PATENTS

| | | | |
|---|---|---|---|
| 2,822,729 | 2/1958 | Capatosto | 355/71 X |
| 3,107,578 | 10/1963 | Engelage | 355/36 |
| 3,295,425 | 1/1967 | Bing et al. | 355/21 X |
| 3,492,070 | 1/1970 | Zahn | 355/37 |
| 3,561,867 | 2/1971 | Simmon | 355/67 |
| 3,684,371 | 8/1972 | Weisglass et al. | 355/37 X |
| 3,756,712 | 9/1973 | Weisglass | 355/71 |
| 3,756,719 | 9/1973 | Harter | 355/67 |

*Primary Examiner*—Richard A. Wintercorn
*Attorney, Agent, or Firm*—Wolder & Gross

[57] ABSTRACT

A photographic enlarger includes separably coupled vertically stacked sections including an upper light housing section, an intermediate filter box and a lower mixing box. The top and bottom of the filter box may correspond in transverse cross section to the confronting faces of the lamp housing and mixing box and have light entrance and exit parts. The filter box may be selected to contain different filter structures and mechanisms to adapt the enlarger for black and white and different color enlarging procedures. The mixing box is provided with light diffusing inner faces and mirror arrangements to increase the light intensity at the negative borders to effect uniform illumination of the negative.

10 Claims, 10 Drawing Figures

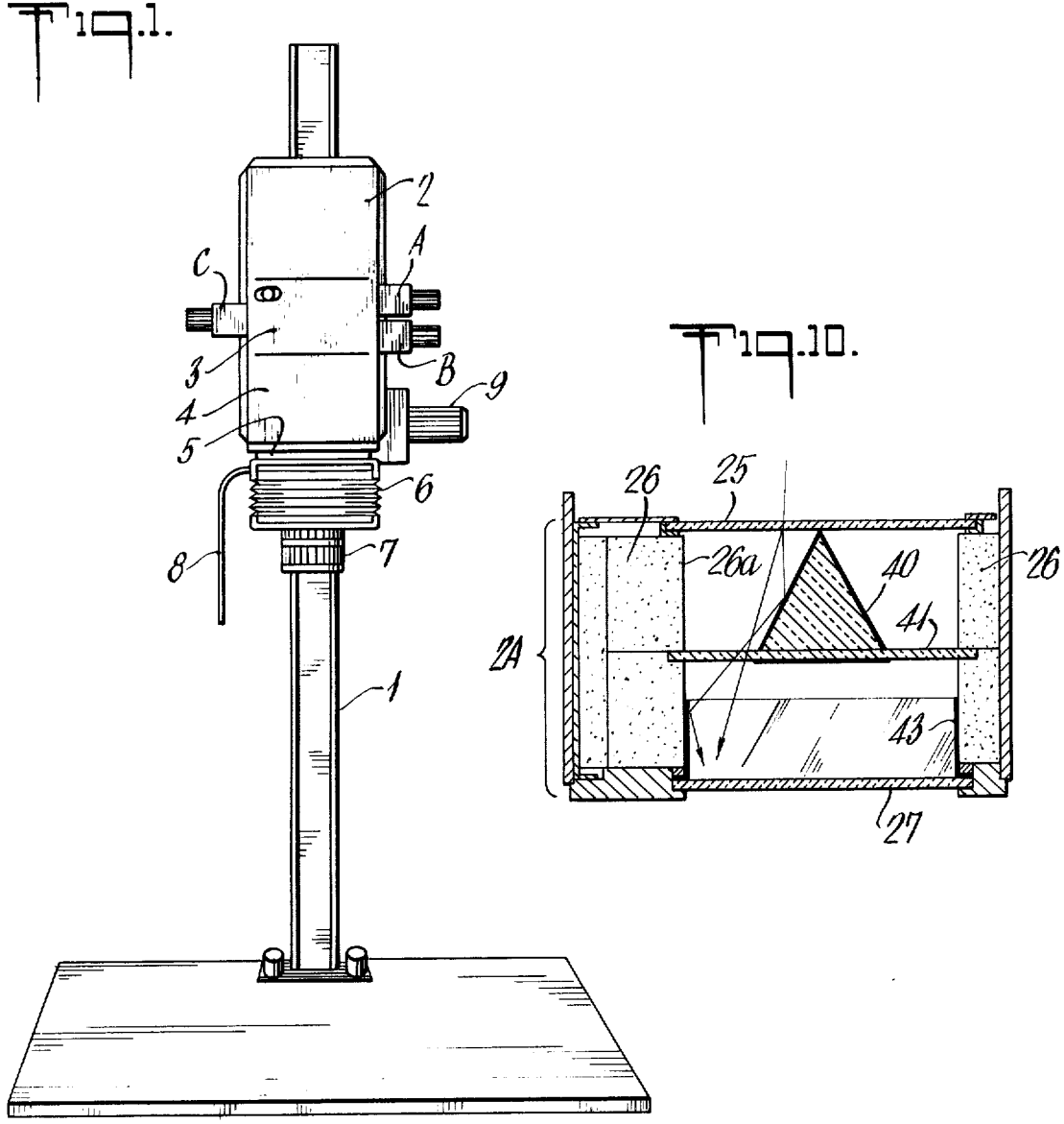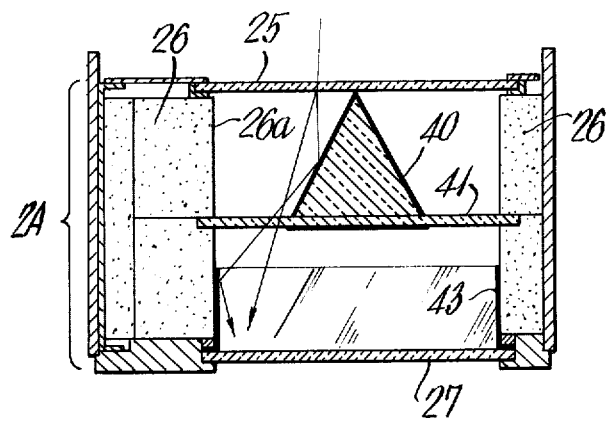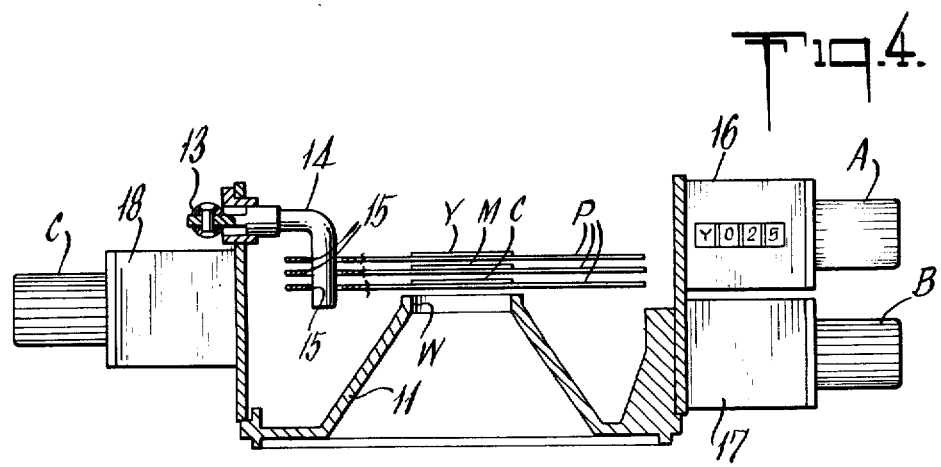

PHOTOGRAPHIC ENLARGER MIXING BOX

BACKGROUND OF THE INVENTION

The present invention relates generally to improvements in photographic enlargers or enlarging apparatus, and it relates more particularly to an improved enlarger for use in producing color photographs.

There are generally three conditions under which photographic enlargement is applied, with black and white photographic paper, with photographic paper having a variable gamma value for color photographs and with ordinary color photographic paper.

In black and white photograph enlargement a color compensating filter is not required with the light source. In the case in which photographic paper having a variable gamma value is used, yellow and magenta color-compensating filters are required, while in the case where ordinary color photographic paper is employed, yellow, magenta and cyan filters should be used. There are many types of filters for each color and a suitable filter may be selected among these and substituted for each other, although a dichroic filter whose transmitting characteristic is continuously variable has been used. In the latter case, selection and substitution of filters may be avoided, but such transmission variable filter construction is complicated and hence a color photographic enlarger using a filter of this kind is costly. In addition, there arises another difficulty in that the overall size of the light source should be increased because of the use of transmission variable filter mechanism. Since the enlarger structure consists of a main body which is mounted on a vertically movable arm which in turn is mounted on a column, if the enlarger is large in size, then the load on the said arm is great, thus presenting difficulties when moving the main body vertically, with the accompanying impaired stability of the enlarger due to the deflection of the arm. It is thus desirable to provide a compact light source section to avoid the above shortcoming.

On the other hand, from the viewpoint of users of the photographic enlarger, there are those customers who are interested only in enlarging black and white photographs and another who are interested in enlarging color photographs, as well. In this respect, a color enlarger may also be used for black and white enlargements, whereas the black and white photographic enlarger is unsuitable for enlarging color photographs, because of the absence of filters. However, it is not economical or desirable to employ a costly color enlarger for producing only black and white enlargements. It follows from this that the manufacturer should produce two types of enlargers, one for black and white photographs and another for color photographs. This may be said to be a hardship on the manufacturer, such that the respective enlargers for the exclusive use of the black and white photographs and color photographs may be more costly than an enlarger for the common use for the two type of photographs.

As explained above, moreover, the construction of a color photographic enlarger is such that, for adjusting the color of the light source, three filters of different colors are disposed in a manner to properly intercept optical path of the light from the light source, and after having traversed these filters, the light is intimately mixed within a mixing box, after which the spectrally uniform light thus mixed is directed to the surface of the negative film. In an enlarger of this type, it is desired that a distance between the light source and the surface of the negative film be minimized, so as to increase the efficiency of the light from the light source as well as to minimize the over-all size of the enlarger. This necessitates a reduction in the length of the mixing box in the direction of the optical axis to a maximum extent. The reduction in the length of the mixing box however disadvantageously leads to insufficient mixing of the light and a lowered intensity of illumination in the peripheral areas of the surface of the negative film.

It is accordingly an object of the present invention to provide a mixing box, which is free from the above-described drawbacks, reduced in its length and improved in the intensity of illumination in the peripheral areas of the negative film.

Furthermore, the enlarger according to the present invention is constructed to avoid the aforesaid shortcomings experienced with the prior art photographic enlargers by providing a compact light source in size and by affording smooth vertical movement and stability in a color enlarger. In addition, components constituting the enlarger may be replaced as units to permit the application of the enlarger to black and white photographic enlargement, thus affording considerable convenience to the users, because of economy in manufacture resulting from simplified design and fabrication and fabrication due to the adoption of a single type of enlarger.

The above and other objects and features of the present invention will be apparent from a reading of the following description taken in conjunction with the accompanying drawings which illustrate a preferred embodiments thereof.

BRIEF DESCRIPTION OF THE DRAWINGS

FIG. 1 is a front elevational view of an enlarger embodying the present invention;

FIG. 4 is a longitudinal front sectional view thereof;

FIG. 10 is a view similar to FIG. 8 of still another embodiment of the invention.

DESCRIPTION OF THE PREFERRED EMBODIMENTS

Figure 2:
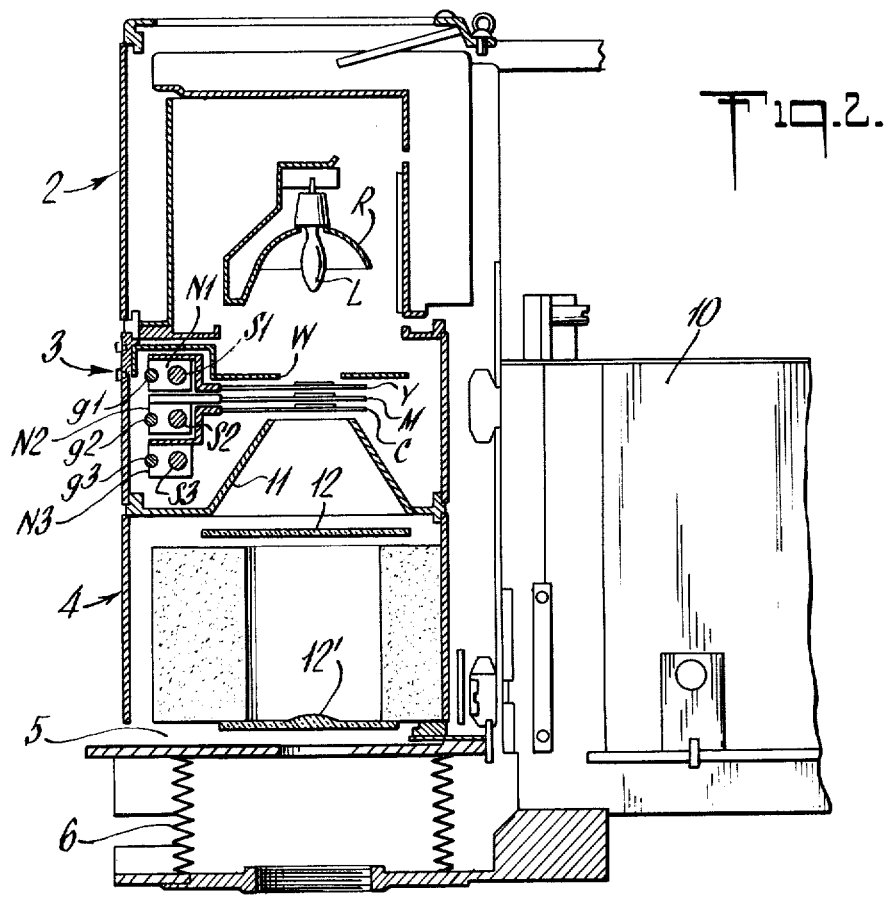
FIG. 2 is a fragmentary medial vertical longitudinal sectional view of the head portion thereof.

Referring now to the drawings particularly FIGS. 1 to 4 thereof which illustrate a first embodiment of the present invention the reference numeral 1 designates a support column, 2 a lamp housing 3, a filter box, and 4 a mixing box. The three components 2, 3 and 4 constitute a light source section. Located under the mixing box 3 is a film receiving portion 5, under which is located a bellows 6 carrying at its lower part an enlarging lens 7. Designated by letters A, B and C are adjusting knobs for respective dichroic filters and shown at 8 is a crank and at 9 a locking bar.

As best seen in FIG. 2, an arm 10 supports the main body proper of the enlarger adjustably on the column 1. Provided within the lamp housing 2 are a lamp L and a reflector R. Disposed in the filter box 3 a filter opening W and Y, M and C are yellow, magenta and cyan dichroic filters, respectively, g1, g2 and g3 are guides and S1, S2 and S3 are feed screws, on which are threaded nuts N1, N2 and N3 adapted to be guided by means of guides g1 to g3. Secured to the nuts N1, N2 and N3 are contacting elements (not shown) which permit the adjustment of the respective filters. The knobs A, B and C, as shown in FIG. 1, serve to rotate feed screws S1 to S3. The filter adjusting mechanism including the guide g1 to g3, feed screws S1 to S3 and nuts N1 to N3 are located in and to one side of the filter box. Located in the center of the filter box 3 is a light reflecting plate 11 of an inverted conical shape and having an inner surface for diffused reflection. Filters Y, M, C are located above the light reflecting plate 11, while the filter box is of a cubic shape, and the diffusing light reflecting plate is of a conical shape, and there is thus a space between the light reflecting plate 11 and the walls of the filter box 3, because of their configuration. This space is not functionally required and is thus utilized for housing the filter adjusting mechanism.

A transparent light diffusing plate 12 is located above the mixing box 4 but below the conical light reflecting plate 11, while the inner surfaces of the mixing box 4 are provided with light diffusing surfaces, such that the paths and directions of the light rays are quite complicated and varied within the mixing box 4, thereby providing a uniform distribution of the intensity of illumination for the entire surface of the film inserted into the film receiving portion 5. Shown at 12' is a transparent light diffusing plate disposed at an exit of light from the mixing box, the thickness of the central portion of the plate 12' being increased for reducing the light passing therethrough.

The lamp house 2, filter box 3 and mixing box 4 are of the same size in transverse cross section and thus may be stacked or placed one on top of the other. The term, "the same size" refers only to the horizontal cross section, and accordingly, the heights of those components differ from each other. In addition, these components may be superposed one on top of the other, but are separable. There are provided three types of filter boxes, one provided with Y, M and C dichroic filters, one provided with two types of dichroic filters for gamma variable photographic paper and one for the black and white photograph including no filter. The configurations of those three types of components of the light source portion are identical. Accordingly, with the use of a single kind of structure except for the filter portion there is provided an enlarger which is usable in common for ordinary color photographic paper, gamma variable photographic paper and black and white photographic paper, by simply replacing one filter portion for another.

Figure 3:
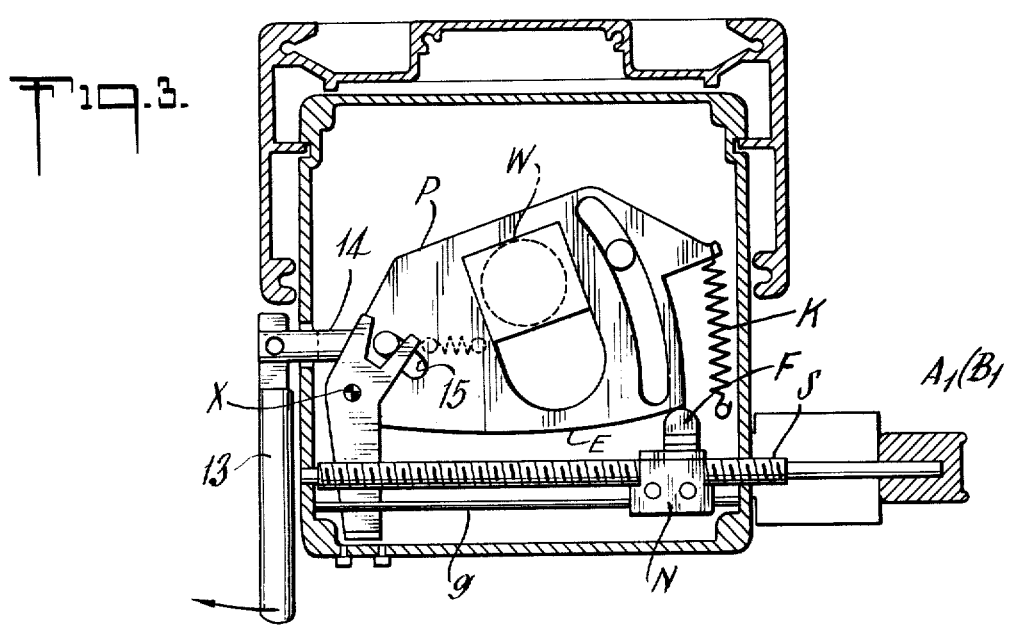
FIG. 3 is a horizontal sectional view of the filter box section.

As seen in FIG. 3 the nuts N are threaded to the feed screws S1 to S3 (suffix numbers will be omitted hereinafter and thus characters 'S' and 'N' represent the aforesaid feed screws) and carry follower elements F thereon, while the nut N is guided by the respective guide g and is adapted to move to the left or right with the rotation of the screw S. A dichroic filter Y (or M or C) is mounted on a filter carrying plate P which pivotally swings about a fulcrum point X and is biased under the action of a spring K toward the follower element F, and the edge E of the plate P contacting the follower element F is curved to define a cam. When the nut N is moved to the left, the plate P rotates in a counterclockwise direction, while the rotating angle thereof is a function of the displacement of the nut N which is a function of the rotating angle of the screw S. Filter numbers are graduated in equally spaced relationship on the knobs A, B and C which rotate the screw S in a manner that the filter characteristics governed by the filter number shown by the graduations conform to those of the dichroic filter in position.

When the color enlarger is used for enlarging black and white photographs, the filters are not required, and the lever 13 is thus moved in a direction shown by the arrow. A connecting bar 14 is thereby pulled to the left and the depending righthand end leg of the connecting bar 14 engaging slots 15 in the filter carrying plates P cause the filters to rotate about the fulcrum point X in a counterclockwise direction so as to be shifted out of registry with the filter window W. The engagement by the righthand end of the connecting bar 14 with the plates P by means of the slots permits the counterclockwise rotation of the respective plates P by the corresponding follower elements F.

Since the variable ranges of the dichroic filters are much wider than that corresponding to one revolution of the knobs A, B and C, the direct indications of the graduations on the knobs will fail to present true indications of the filter numbers. For this reason, as shown in FIG. 4, the rotation of the knobs are so designated as to be transmitted through a reduction gear to indicating our counter means 16 to 18 to thereby clearly indicate the filter numbers.

As is apparent from the foregoing, the improved enlarger or enlarging apparatus described above includes a light source section consisting of a lamp housing filter box and mixing box which are individual units having the same cross sectional configurations, whereby the three components may be superposed and interconnected or coupled one on top of the other to form the light source section. As a result, only if a plurality of types filter boxes are provided to meet the filter requirements, the enlarger may be used in common for the dual purposes heretofore described. Furthermore, the adjusting mechanism for the dichroic filters is located in a space defined between the side wall of the filter box and the conical light reflecting plate which is adapted to reflect the light traversing the filter toward the mixing box and to intercept the diffused light and stray light (the light which has not traversed a filter) within the filter box. This in turn reduces the required size of the filter box compact, with the resulting compactness of the filter box and the enlarger itself.

Figure 5:
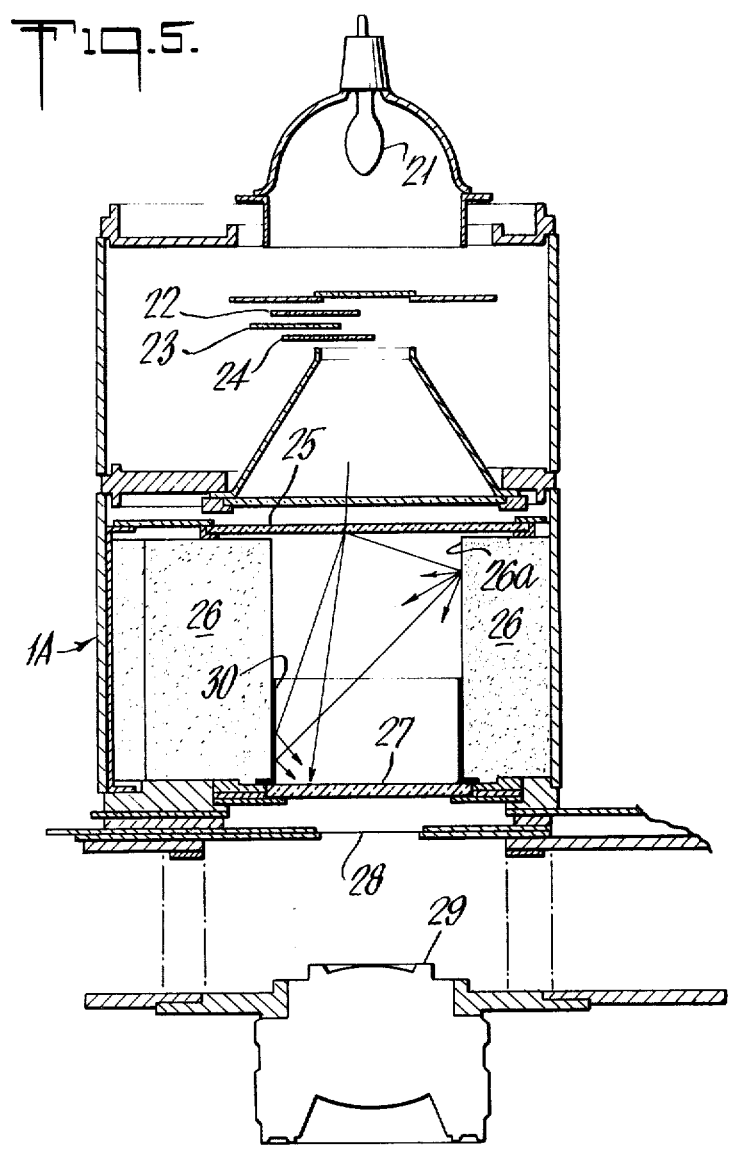
FIG. 5 is a view similar to FIG. 2 of another embodiment of the present invention.

In FIG. 5 of the drawing there is illustrated another embodiment of the present invention, characterized by a highly compact mixing box in an enlarger of the subject type which has disposed below a lamp of a light source 21, three color filters 22, 23 and 24, which are shiftable independently of each other in a direction perpendicular to the optical axis of the lamp 1 for color adjustment. Thus, part of light from the lamp 1 passes through one of the color filters, another part of the light passes through a plurality of color filters and the remaining part of the light traverses no filter, and hence the light from the light source, immediately after having traversed these filters possesses different spectra depending upon the incident direction of the light. The improved enlarger includes a mixing box 1A. Light which traverses the filter portion, passes through a first transparent diffusing plate 25 formed of frosted glass or acrylic plate or the like, and is then diffused within the mixing box. A side wall 26 of the mixing box is made of a foamed polystyrene sheet or the like and has an inner face which presents a reflecting diffusing surface 26a of a circular or rectangular cylindrical shape covering the entire inside surface of the mixing box. Light, which has been diffused through the transparent diffusion plate 25, is intimately mixed by being reflecting and diffused by the reflecting diffusing surface 26a, then diffused when passing through a second transparent diffusing plate 27, and projected on to the surface of the negative film 28. Shown at 29 is an enlarging lens.

A reflecting mirror 30 is disposed adjacent to the light exit port of the mixing box, with its specular face being directed inwardly thereof, so as to avoid a decrease in the intensity of illumination in the peripheral portion of the surface of the negative film. In the present embodiment the reflecting mirror 30 is bonded to the face 26a of side wall 26 in a manner to cover the entire inner peripheral face of the lower portion of the mixing box. The length along the optical axis of the mirror in which most effective result is obtained depends upon the overall length of the mixing box, the characteristics of the reflecting, diffusing surface and the like, and the actual value of the length is easily and readily determined by simple testing when the respective box is designed. Alternatively the lengths of the sides of the mirror may be variant throughout the entire peripheral portions in a manner that peripheral sides of the mirror may correspond in length to the quadrilateral shape of the negative film. The reflecting mirror 30 need not necessarily cover the entire peripheral face of the lower portion of the mixing box, but a plurality of mirrors may be disposed in symmetrical relation to each other, with their specular surfaces directed inwardly. Alternatively, a circular or polygonal cylinder the inner surface of which is made of reflecting mirror may be disposed adjacent to the light exit port of the mixing box in coaxial relationship with the optical axis.

Figure 6:
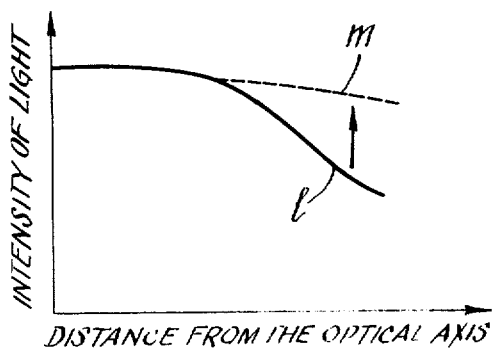
FIG. 6 is a graph illustrating the negative illumination characteristics of the embodiment of FIG. 5.

In the operation of the reflecting mirror 30, consider first the case where no reflecting mirror is provided. If the length of the mixing box is shortened, the intensity of the light illuminating the surface of the negative film decreases with the increase in distance from the optical axis, as shown by solid line 1 in FIG. 6. In other words, the intensity of light at the edges and corners of the negative film which are portions far from the optical axis is lowered. In contrast, if the mirror 30 is disposed adjacent to the light exit port of the mixing box, with its mirror face being directed inwardly thereof, then light strikes the mirror 30 and then is equiangularly reflected by the mirror 30 so as to be selectively projected on the portion of the mixing box which is close to inner peripheral surface of the light exit port thereof, rather than being diffused. This compensates for the shortage in the amount of light from the peripheral portion of the light exit port of the mixing box thus obviating or minimizing any decrease in the intensity of illumination at the peripheral portion of the surface of the negative film, as shown by a dotted line m in FIG. 6.

The reflecting mirror 30 need not necessarily have a truly flat mirror face, but may have a semi-diffusing surface which provides a considerable amount of equiangular reflection of the light. In this latter case, the quantity of light which is selectively reflected to the peripheral portion of the negative film is slightly lowered, as compared with the case of a true mirror or specular surface. However, the mixing of the light may be improved due to the diffusing characteristic incorporated therein. Whether a true mirror surface or a semi-diffusing surface is used as the reflecting surface of the mirror depends upon the nature of the mixing box. Meant by the reflecting surface of mirror as used in the present application is the true flat mirror surface or the semi-diffusing reflecting surface.

Figure 7:
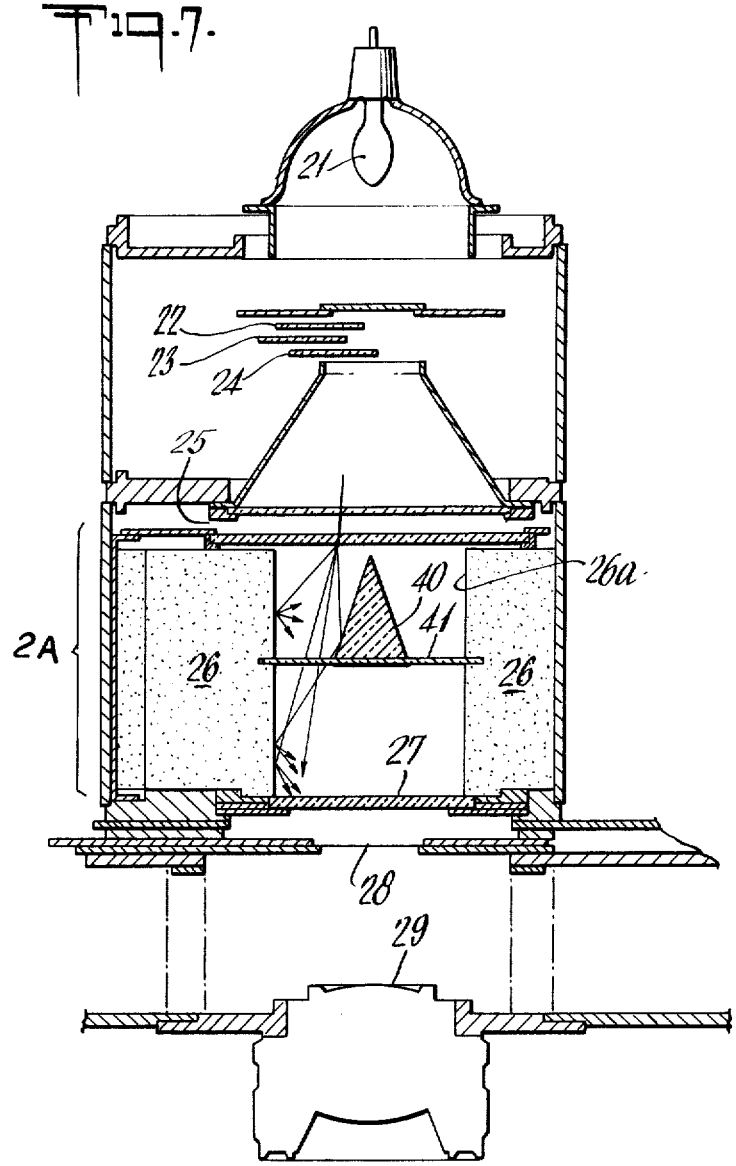
FIG. 7 is a view similar to FIG. 5 of a further embodiment of the invention.
Figure 8:
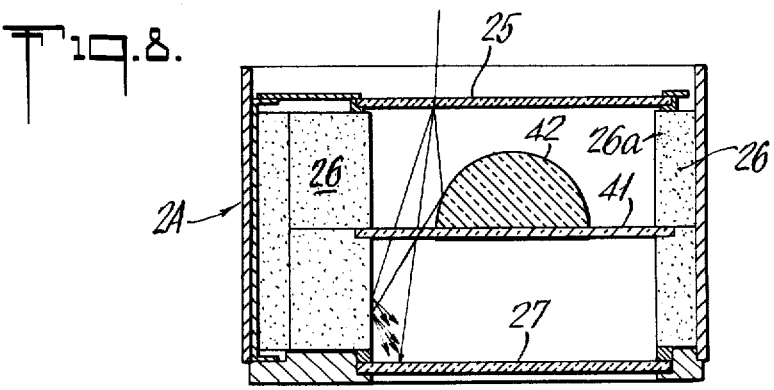
FIG. 8 is a vertical sectional view of the mixing box of another embodiment of the present invention.

The embodiment of the present invention illustrated in FIG. 7 is, except for the reflector system in the mixing box 2A, similar to the structure shown in FIG. 5 and the same reference numerals designate the same elements. Specifically, a reflective mirror 40 is centrally disposed within the upper part of the mixing box 2A, with its reflecting surface being outwardly directed. In the illustrated embodiment the reflecting mirror 40 is of a conical shape having a mirror surface applied to its outer conical peripheral surface, and being mounted on a transparent plate 41 made of an acrylic resin within the mixing box. The reflecting mirror is not limited to a conical shape, but may be of a semi-spherical shape as shown in the embodiment shown in FIG. 8 or may be of a column shape, or the like. The surface of a body of revolution is not necessarily used as a mirror but the surface of a member of pyramid or truncated pyramid may be used. The length or height of the mirror may be varied depending on its positions.

The mounting of the mirror in the mixing box is not limited to the use of the acrylic transparent plate 41 for supporting the mirror but it may be bonded to the first diffusing plate 25 or formed integrally therewith.

Figure 9:
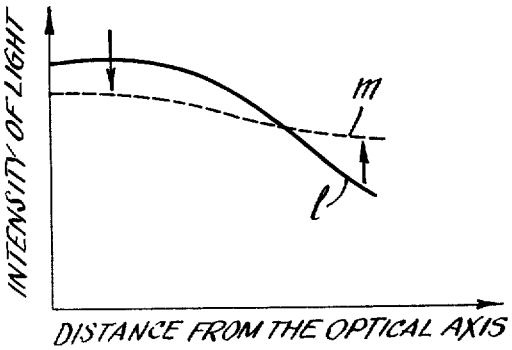
FIG. 9 is a graph illustrating the negative illumination characteristics of the enlarger.

In the operation of a mixing box including the reflecting mirror 40 extending centrally and upwardly therein, with its mirror surface being directed outwardly, in the absence of the mirror 40 in the mixing box, if the length of the mixing box is reduced, the intensity of illumination on the surface of negative film is decreased with an increase in distance from the optical axis as shown by a solid line 1 in FIG. 9. In contrast, if the mirror 40 is provided in the mixing box, the aforesaid mirror equiangularly reflects part of the light directed to the mid portion of the light exit port of mixing box, such that part of the light thus reflected is partly projected on the peripheral portion of the light exit of the mixing box, with the other part of light being selectively projected on the lower portion of the diffusing reflecting surface 26a. The diffusing, reflecting surface 26a, diffuses and reflects the light projected thereon. However, the light thus reflected includes components having the most intense reflecting capability in the equi-angular direction with respect to the direction of incident light, such that most of the reflected light is projected from the inner peripheral portion of mixing box. This compensates for the usual decrease in the intensity of illumination at the peripheral portion of the surface of the negative film, with the result that an improved illumination distribution is achieved as shown by the dotted line m in FIG. 9. It is to be noted that the intensity of illumination is slightly lowered in the vicinity of the optical axis. This is because the mirror prevents part of light from entering the mid portion.

FIG. 10 shows a further embodiment of the present invention, wherein in addition to the reflecting mirror 40 another reflecting mirror 43 is provided in the vicinity of the light exit port of the mixing box, with its mirror face being directed inwardly. With the construction shown in FIG. 10, light, which has been reflected by the outwardly directed reflecting mirror 40, falls on the reflecting mirror 43 having an inwardly directed reflecting face and is then selectively projected onto the peripheral portion of the light exit port of the mixing box due to the equi-angular reflection by the mirror 13, such that the efficiency in the intensity of the illumination in that area is further increased. The reflecting mirror 43 having an inwardly directed reflecting face may be provided within the mixing box, in addition to the other reflecting mirror, if it is desired, in the design of the mixing box.

The reflecting surface of reflecting mirror 40 of the present invention is as earlier explained, not necessarily true mirror surface but may be semi-diffusing surface possessing equi-angular reflecting properties, that is, the angle incidence is equal to the angle of reflection. In the latter case, a quantity of light which is to be selectively reflected on the lower portion of diffusing reflecting surface 26a is slightly reduced, while the mixing of light is improved due to the diffusing capability. Whether a mirror surface or a semi-diffusing surface is employed as a reflecting surface of the mirror is selective, depends upon the nature of the mixing box. What is meant by the reflecting surface of the mirror as used in the present application is the true mirror surface or the semi-diffusing surface.

According to the present invention, since the decrease in intensity of illumination in the peripheral portion of the surface of negative film is obviated, reduction in the length of the mixing box may be achieved. The reflecting mirror provided centrally of the mixing box is adjustable in shape and size, so as to limit to a desired extent illumination of light coming from the central portion of mixing box, thereby directing the light to the peripheral portion thereof. This is particularly useful in a mixing box of large diameter. Reduction in the length of the mixing box effects a reduction in the size and bulk of the head portion of the enlarger and contributes to an improved efficiency in the light source. This permits the use of a lamp lesser power which results in the feasibility of a compact cooling means for use with such a lamp.

While there have been described and illustrated preferred embodiments of the present invention it is apparent that numerous alterations, omissions and additions may be made without departing from the spirit thereof.

I claim:

1. In a photographic enlarger having a light source and a filter box including filters and a mechanism for adjustment of said filters and a mixing box including an entrance for the light emerging from said filter box and a diffusing inside surface for mixing the light and an exit for mixed light, means for increasing the intensity of the light projected toward the peripheral area of said mixing box exit characterized in that said means for increasing the intensity of light comprises an inwardly facing reflecting surface disposed at the lower part of the inner periphery of said mixing box and said diffusing inside surface is disposed at the upper part of the inner periphery of said mixing box.

2. A photographic enlarger as in claim 1, wherein said inwardly facing reflecting surface is a mirror covering the lower part of said diffusing inner side surface.

3. A photographic enlarger as in claim 1 including reflecting means comprising an outwardly facing reflecting surface centrally disposed within the upper part of said mixing box.

4. A photographic enlarger as in claim 3, wherein said outwardly facing reflecting surface is a peripheral face of a cone centrally located within the upper part of said mixing box.

5. A photographic enlarger as in claim 1, wherein said mechanism for the adjustment of the filters comprises a plurality of combinations for independently adjusting the respective filters, each of said combinations including a member for supporting a filter for rotation between a first position with the filter fully registering with the light path and a second position with the filter completely out of registry with the light path and normally biased to said first position, said support member being provided with a cam edge elongated in a direction receding from the axis of rotation thereof, and a movable member contacting said cam edge at the remotest part thereof from said axis of rotation for setting said support member at said first position and further movable toward the axis of rotation for rotating said support member toward the second position by means of contact with said cam edge.

6. A photographic enlarger as in claim 5, further comprising a second movable member movable between a rest position and a position urging said support members of all of said combinations into said second positions thereof by means of engagement with openings respectively provided in the support members, said openings being respectively arranged so as to allow the rotation of the support members with said second movable member in said rest position.

7. A photographic enlarger as in claim 1, wherein said light source, said filter box and said mixing box are respectively defined by three separate units, said three units being detachably combined to form the enlarger.

8. In a photographic enlarger having a light source and a filter box including filters and a mechanism for the adjustment thereof, a mixing box having an entrance for the light emerging from the filter box and a diffusing inside surface for mixing the light and an exit for the mixed light, wherein said mixing box comprises reflecting means for increasing the intensity of the light projected toward the peripheral areas of said mixing box exit and including a semi-sphere centrally located within the upper part of said mixing box and having an outwardly facing peripheral reflecting surface.

9. In a photographic enlarger having a light source and a filter box including filters and a mechanism for adjustment of said filters, a mixing box comprising:
an entrance for the light emerging from said filter box;
first inwardly facing means disposed under said entrance for diffusing the light incident thereon for mixture;
an exit for the mixed light; and
second inwardly facing means disposed between said first inwardly facing means and said exit for equi-angularly reflecting at least most of the light incident thereon for increasing the intensity of the light projected toward the peripheral area of said exit.

10. A mixing box as in claim 8 further comprising outwardly facing means disposed centrally within said mixing box and under said entrance for reflecting a part of the light passed said entrance toward said second inwardly facing means and permitting the other part of the light to directly impinge on said first and second inwardly facing means.

* * * * *